(12) United States Patent
Haghighat et al.

(10) Patent No.: US 10,992,411 B2
(45) Date of Patent: Apr. 27, 2021

(54) SYSTEM AND METHOD FOR HIGH RELIABILITY TRANSMISSION WITH SUPERPOSITION MODULATION AIDED NETWORK CODING

(71) Applicant: IDAC Holdings, Inc., Wilmington, DE (US)

(72) Inventors: Afshin Haghighat, Ile-Bizard (CA); Sanjeewa Herath, Ottawa (CA)

(73) Assignee: IDAC Holdings, Inc., Wilmington, DE (US)

(*) Notice: Subject to any disclaimer, the term of this patent is extended or adjusted under 35 U.S.C. 154(b) by 109 days.

(21) Appl. No.: 16/089,017

(22) PCT Filed: Mar. 30, 2017

(86) PCT No.: PCT/US2017/025162
§ 371 (c)(1),
(2) Date: Sep. 27, 2018

(87) PCT Pub. No.: WO2017/173156
PCT Pub. Date: Oct. 5, 2017

(65) Prior Publication Data
US 2020/0145133 A1 May 7, 2020

Related U.S. Application Data

(60) Provisional application No. 62/316,320, filed on Mar. 31, 2016.

(51) Int. Cl.
*H04L 1/00* (2006.01)
*H04B 7/0413* (2017.01)

(52) U.S. Cl.
CPC .......... *H04L 1/0041* (2013.01); *H04L 1/0026* (2013.01); *H04L 1/0047* (2013.01);
(Continued)

(58) Field of Classification Search
CPC .... H04B 3/36; H04B 7/15521; H04B 7/2606; H04B 7/2656; H04B 17/336; H04L 27/34;
(Continued)

(56) References Cited

U.S. PATENT DOCUMENTS 7,657,815 B2 * 2/2010 Seidel ................... H04W 36/18
714/748
7,729,232 B2 * 6/2010 Wang .................... H04L 5/0064
370/203
(Continued)

FOREIGN PATENT DOCUMENTS

CN 101350644 A 1/2009
WO 2008154506 A1 12/2008

OTHER PUBLICATIONS

International Preliminary Report on Patentability for PCT/US2017/025162 dated Oct. 11, 2018.
(Continued)

*Primary Examiner* — Man U Phan
(74) *Attorney, Agent, or Firm* — Invention Mine LLC

(57) ABSTRACT

Systems and methods described herein employ wireless physical network coding (WPNC) together with superposition modulation to support a highly reliable transmission. Embodiments include a composite constellation for carrying the side information that avoids use of extra resources. In additional embodiments, the MIMO, multi-stream transmission and multi-user superposition transmission (MUST) configurations are configured to utilize superposition modulation signaling.

19 Claims, 15 Drawing Sheets

(52) U.S. Cl.
CPC .......... *H04L 1/0061* (2013.01); *H04L 1/0076* (2013.01); *H04B 7/0413* (2013.01)

(58) Field of Classification Search
CPC ... H04L 1/1607; H04L 1/0045; H04L 1/1812; H04L 1/1835; H04L 1/1845; H04L 43/028; H04L 43/06; H04L 1/007; H04L 27/3411; H04L 1/0065; H04W 84/042; H04W 72/082
USPC .......................................................... 370/329
See application file for complete search history.

(56) References Cited

U.S. PATENT DOCUMENTS

| | | | | |
|---|---|---|---|---|
| 7,864,883 | B2* | 1/2011 | Park | H04L 27/34 375/298 |
| 7,920,825 | B2* | 4/2011 | Popovski | H04B 7/2603 455/11.1 |
| 7,921,348 | B2* | 4/2011 | Seidel | H04L 1/1848 714/751 |
| 7,961,814 | B2* | 6/2011 | Golitschek Edler Von Elbwar | H04L 27/34 375/298 |
| 8,085,819 | B2* | 12/2011 | Kiran | H04L 1/0017 370/527 |
| 8,358,608 | B2* | 1/2013 | Josiam | H04L 1/1819 370/315 |
| 8,559,311 | B2* | 10/2013 | Hwang | H04B 7/15521 370/235 |
| 8,773,975 | B2* | 7/2014 | Sun | H04B 7/15521 370/216 |
| 8,824,601 | B2* | 9/2014 | Malladi | H04L 27/2604 375/340 |
| 9,344,013 | B2* | 5/2016 | Jarry | B60N 2/821 |
| 10,419,132 | B2* | 9/2019 | Fine | H04L 1/0042 |
| 10,517,092 | B1* | 12/2019 | Weiss | H04W 72/0446 |
| 10,594,435 | B2* | 3/2020 | Zhang | H03M 13/152 |
| 2009/0268790 | A1 | 10/2009 | Josiam | |
| 2012/0300692 | A1 | 11/2012 | Sfar | |

OTHER PUBLICATIONS

Notification of Transmittal of the International Search Report and the Written Opinion of the International Searching Authority, or Declaration for PCT/US2017/025162 dated Jul. 7, 2017, 15 pages.
Moslem Noori et al: "On Symbol Mapping for Binary Physical-Layer Network Coding with PSK Modulation", IEEE Transactions on Wireless Communications, IEEE Service Center, Piscataway, NJ, US, vol. 11, No. 1, Jan. 1, 2012 (Jan. 1, 2012), pp. 21-26, XP011398634, ISSN: 1536-1276, DOI: 10.1109/TWC.2011.110811. 110347, Sections I-IV, 6 pages.
Yu, H., et. al., "Superposition Data Transmission for Cognitive Radios: Performance and Algorithms", Published by IEEE 978-1-4244-2677-5/08. Date of Conference: Nov. 16-19, 2008. Added to IEEE Xplore Jan. 9, 2009. Available at: http://wisrl.kaist.ac.kr/papers/YuSungLee08MILCOM.pdf.
Prochazka, P., et. al., "Relaying in Butterfly Network: Superposition Constellation Design for Wireless Network Coding", Published by IEEE 978-1-4673-6305-1. Date of Conference: Jun. 8-12, 2015. Added to IEEE Xplore Sep. 14, 2015.
Recommendation ITU-R M.2083-0 (Sep. 2015), "IMT Vision—Framework and overall objectives of the future development of IMT for 2020 and beyond," M Series, ITU 2015.
NGMN Alliance, "5G White Paper," NGMN 5G Initiative, version 1.0, Feb. 17, 2015.
3GPP TR 38.913 V0.2.0 (Feb. 2016), "3rd Generation Partnership Project; Technical Specification Group Radio Access Network; Study on Scenarios and requirements for next generation access technologies"; (Release 14), 3GPP, 2016.
Popovski, P. "Ultra-Reliable Communication in 5G Wireless Systems," 1st International Conference on 5G for Ubiquitous Connectivity, (2014). 978-1-63190-055-6, copyright 2014 1CST.
Johansson, N. A., et. al., "Radio access for ultra-reliable and low-latency 5G communications," IEEE ICC 2015, Workshop on 5G and Beyond—Enabling Technologies and Applications. IEEE 2015, 978-1-4673-6305-1/15.
Nazer B., et. al., "Reliable Physical Layer Network Coding," Proceedings of the IEEE, vol. 99, No. 3, Mar. 2011. DOI: 10.1109/JPROC.2010.2094170.
Katti, S., et. al., "XORs in the air: Practical Wireless Network Coding," IEEE/ACM Transactions on Networking, vol. 16, No. 3, Jun. 2008. DOI: 10.1109/TNET.2008.923722.
Yang, H., et., al., "Physical Layer Implementation of Network Coding in Two-Way Relay Networks," IEEE ICC 2012, Ad-hoc and Sensor Networking Symposium. 978-1-4577-2053-6/12. IEEE 2012.
Lu, L., T., et. al., "Implementation of Physical-Layer Network Coding," IEEE ICC 2012, Wireless Communications Symposium. 978-1-4577-2053-6/12. IEEE 2012.
Uricar, T., et. al., "Superposition Coding for Wireless Butterfly Network with Partial Network Side-Information," IEEE 2013, WCNC Workshop on New Advances for Physical Layer Network Coding. 978-1-4799-0110-4/13. IEEE 2013.
3GPP TR 36.859 V1.0.1 (Nov. 2015), "3rd Generation Partnership Project; Technical Specification Group Radio Access Network; Study on downlink multiuser superposition transmission (MUST) for LTE," (Release 13) 3GPP, 2015.
3GPP TR 36.859 V13.0.0 (Dec. 2015), "3rd Generation Partnership Project; Technical Specification Group Radio Acces Network; Study on downlink multiuser superposition transmission (MUST) for LTE," (Release 13) 3GPP, 2015.

* cited by examiner

SYSTEM AND METHOD FOR HIGH RELIABILITY TRANSMISSION WITH SUPERPOSITION MODULATION AIDED NETWORK CODING

CROSS-REFERENCE TO RELATED APPLICATION

The present application is a national stage application under 35 U.S.C. 371 of International Application No. PCT/US2017/025162, entitled SYSTEM AND METHOD FOR HIGH RELIABILITY TRANSMISSION WITH SUPERPOSITION MODULATION AIDED NETWORK CODING, filed Mar. 30, 2017, which claims benefit under 35 U.S.C. § 119(e) from, U.S. Provisional Application Ser. No. 62/316,320, filed Mar. 31, 2016 and entitled "System and Method for High Reliability Transmission with Superposition Modulation Aided Network Coding."

BACKGROUND

As the applications and ubiquity of cellular communication systems grow, they are expected to support new features, and meet a more stringent set of performance requirements. Based on the general requirements set out by International Telecommunication Union (ITU) Radiocommunication Sector (ITU-R), Next Generation Mobile Networks (NGMN) Alliance and the 3rd Generation Partnership Project (3GPP), a broad classification of the use cases for emerging 5G systems can be depicted as follows: Enhanced Mobile Broadband (eMBB), Massive Machine Type Communications (mMTC) and Ultra Reliable and Low-Latency Communications (URLLC). The use cases can be translated into more practical terms such as, higher data rate, better indoor/outdoor quality of service, lower latency and higher reliability.

SUMMARY

The present disclosure describes systems and methods for modulating and demodulating radio-frequency transmissions. In an exemplary modulation method, data packets are encoded using symbols in a primary constellation, and side information is encoded using symbols in a side-information constellation that is superimposed on the primary constellation to generate a composite constellation. A data packet and its associated side information are transmitted together using symbols in the composite constellation. In some embodiments, the side information is usable for packet reconstruction. For example, a user equipment (UE) device may receive a first transmission and a second transmission encoded using the composite constellation, where the first and second transmissions encode different data packets but the same side information. The UE attempts to decode a first data packet from the first transmission, but in the event of an error, the first data packet may be reconstructed from the side information and from the data packet of the second transmission. For example, the first data packet may be recovered by performing a bitwise XOR operation on the data packet of the second transmission and the side information.

In an exemplary embodiment, a method is provided of transmitting at least a first data packet and a second data packet. In the method, side information is generated as a function of the first data packet and the second data packet, for example by performing a bitwise XOR operation or other combination function on the first and second data packets. The first data packet and the side information are encoded as a first set of symbols in a composite constellation, wherein the composite constellation comprises a side-information constellation for encoding the side information superimposed on a primary constellation for encoding data packet information. The second data packet and the side information are encoded as a second set of symbols in the composite constellation. The first set of symbols and the second set of symbols are transmitted using different transmission resources (e.g. different time resources or different frequency resources).

In some embodiments, the side information is generated such that each of the first and second data packets is recoverable as a function of the side information and the other of the first and second data packets.

The composite constellation is represented in some embodiments by $$s_i = \sqrt{1-\alpha}\, x_1 + \sqrt{\alpha}\, x_2$$

where $x_1$ is a complex value representing a point in the primary constellation, $x_2$ is a complex value representing a point in the side-information constellation, and $\alpha$ is a power split parameter with $0 \leq \alpha \leq 1$. In some embodiments, $\alpha \leq 0.10$. In some embodiments, $\alpha \leq 0.05$.

In some embodiments, the side-information constellation has a greater number constellation points than the primary constellation. In some such embodiments, the side information is encoded at a lower symbol rate than the first and second data packets.

In some embodiments, the composite constellation is generated such that the side-information constellation is rotated by an amount determined by a quadrant of the composite constellation point.

In an exemplary method performed by a user equipment (UE) entity, the UE receives the first set of symbols and the second set of symbols. The UE decodes at least one of the first set of symbols and the second set of symbols to obtain the side information. The decoding of the side information may be performed using a combination of the first and second set of symbols. In some embodiments, the decoding involves rotating (e.g. phase shifting) at least one symbol in one of the sets and adding the rotated symbol with a corresponding symbol in the other set. The amount of the rotation may be based on a quadrant of the symbol. In the exemplary method, the UE decodes the second set of symbols to obtain the second data packet and recovers the first data packet from the second data packet and the side information. In some embodiments, recovery of the first data packet may include combining the second data packet and the side information using a bitwise XOR operation. In some embodiments, the recovery of the first data packet is performed only in response to an error in decoding the first set of symbols to obtain the first data packet.

In some of the systems and methods disclosed herein for high reliability transmission with superposition modulation aided network coding (NC) or wireless physical network coding (WPNC), the focus is on the reliability aspect of a radio link. There are different dimensions to the design of a wireless Ultra Reliable Communication (URC) system. In a URC system, potential impediments to achieve high reliability can be classified as follows: decreased power of the useful signal, uncontrollable interference, resource depletion due to competition, protocol mismatch and equipment failure. In the systems and methods disclosed herein, systems and methods are introduced for mitigating the first problem that is related to the minimum signal for proper detection.
}

In at least one embodiment, the systems and methods disclose a scheme that combines WPNC together with superposition modulation to support a highly reliable transmission. The first feature of the presented scheme is the use of composite constellation for carrying the side information that avoids use of any extra resources. Some embodiments described herein implement WPNC-based relay network without the use of extra resources in time or frequency to facilitate side information ("SI"). While SI is essential to improve the transmission reliability in a WPNC arrangement, a direct usage of extra physical resources for SI transmission degrades the overall spectral efficiency of the system.

In additional embodiments, the MIMO, multi-stream transmission and multi-user superposition transmission (MUST) configurations are configured to utilize the superposition modulation signaling described.

DETAILED DESCRIPTION

A detailed description of illustrative embodiments will now be provided with reference to the various Figures. Although this description provides detailed examples of possible implementations, it should be noted that the provided details are intended to be by way of example and in no way limit the scope of the application.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Network Architecture.

Figure 1A:
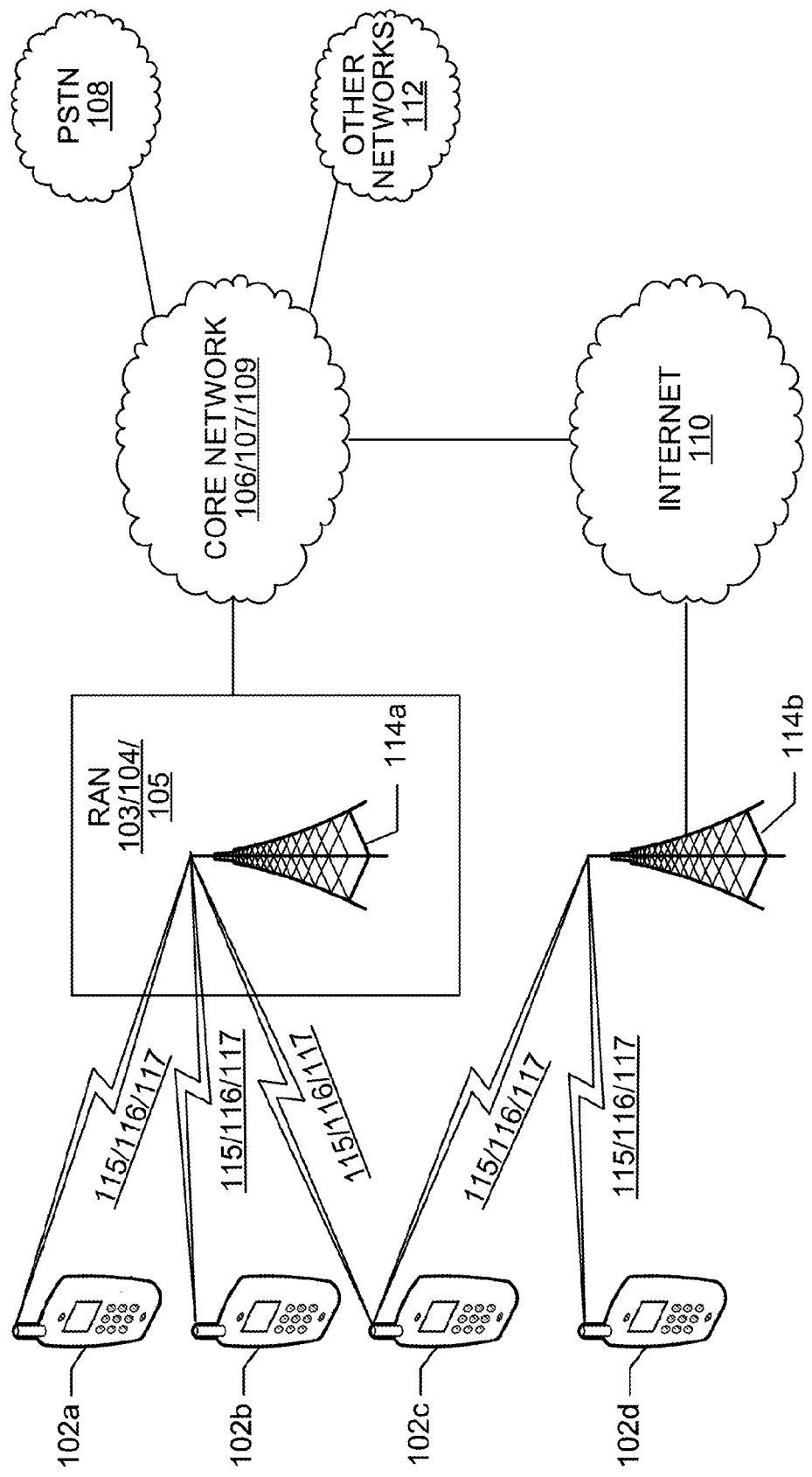
FIG. 1A depicts an example communications system in which one or more disclosed embodiments may be implemented.

The systems and methods disclosed herein may be used with the wireless communication systems described with respect to FIGS. 1A-1F. As an initial matter, these wireless systems will be described. FIG. 1A is a diagram of an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel-access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include WTRUs 102a, 102b, 102c, and/or 102d (which generally or collectively may be referred to as WTRU 102), a RAN 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, and the like). The air interface 115/116/117 may be established using any suitable radio access technology (RAT).

More specifically, as noted above, the communications system 100 may be a multiple access system and may employ one or more channel-access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSDPA).

In another embodiment, the base station 114a and the WTRUs 102a, 102b, 102c may implement a radio technology such as Evolved UMTS Terrestrial Radio Access (E UTRA), which may establish the air interface 115/116/117 using Long Term Evolution (LTE) and/or LTE Advanced (LTE A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS 2000), Interim Standard 95 (IS 95), Interim Standard 856 (IS 856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, as examples, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, and the like) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. As examples, the core network 106/107/109 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and IP in the TCP/IP Internet protocol suite. The networks 112 may include wired and/or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
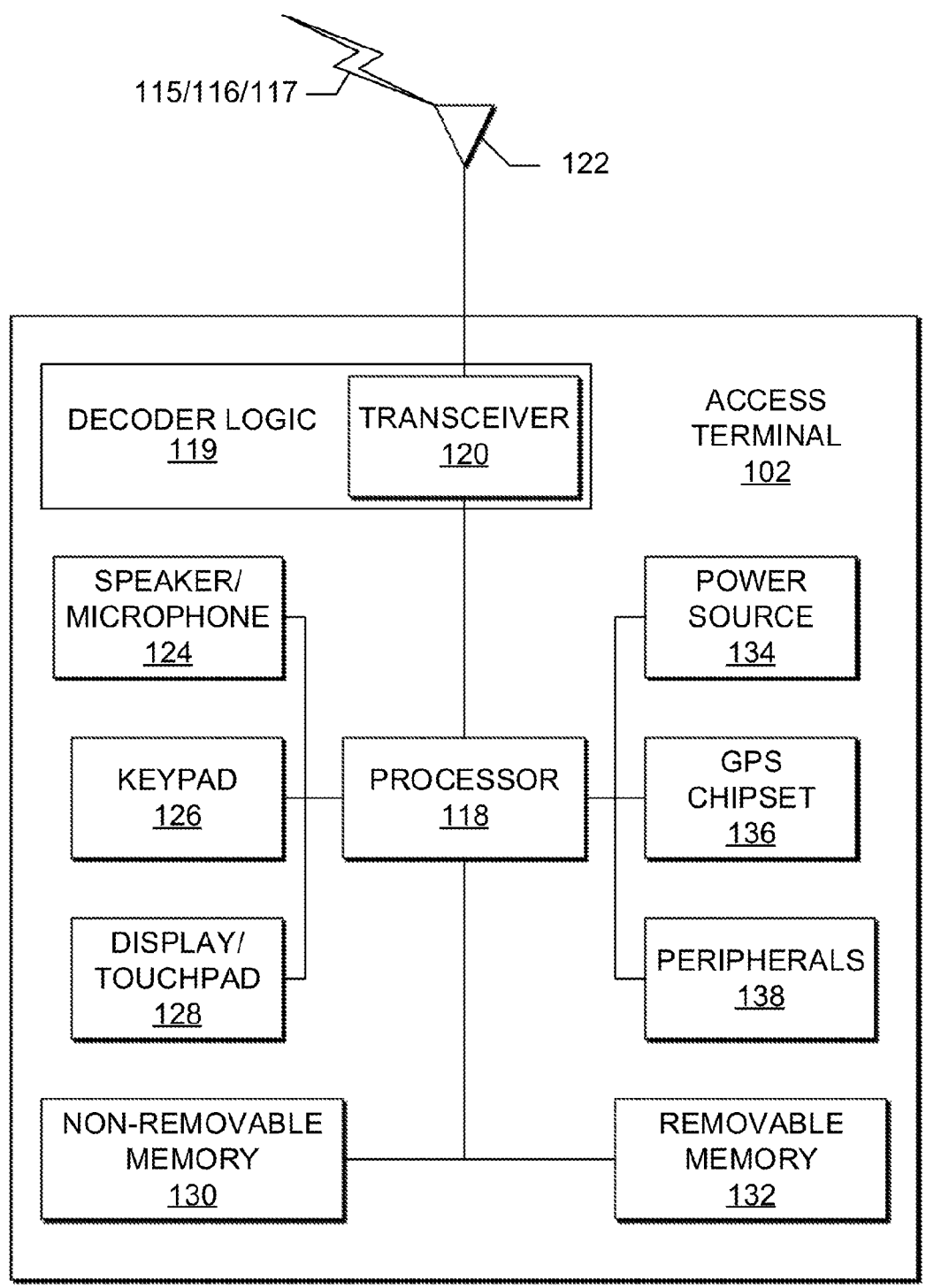
FIG. 1B depicts an example wireless transmit/receive unit (WTRU) that may be used within the communications system of FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, a non-removable memory 130, a removable memory 132, a power source 134, a global positioning system (GPS) chipset 136, and other peripherals 138. The transceiver 120 may be implemented as a component of decoder logic 119. For example, the transceiver 120 and decoder logic 119 can be implemented on a single LTE or LTE-A chip. The decoder logic may include a processor operative to perform instructions stored in a non-transitory computer-readable medium. As an alternative, or in addition, the decoder logic may be implemented using custom and/or programmable digital logic circuitry.

It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, as examples. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, as examples.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. As examples, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
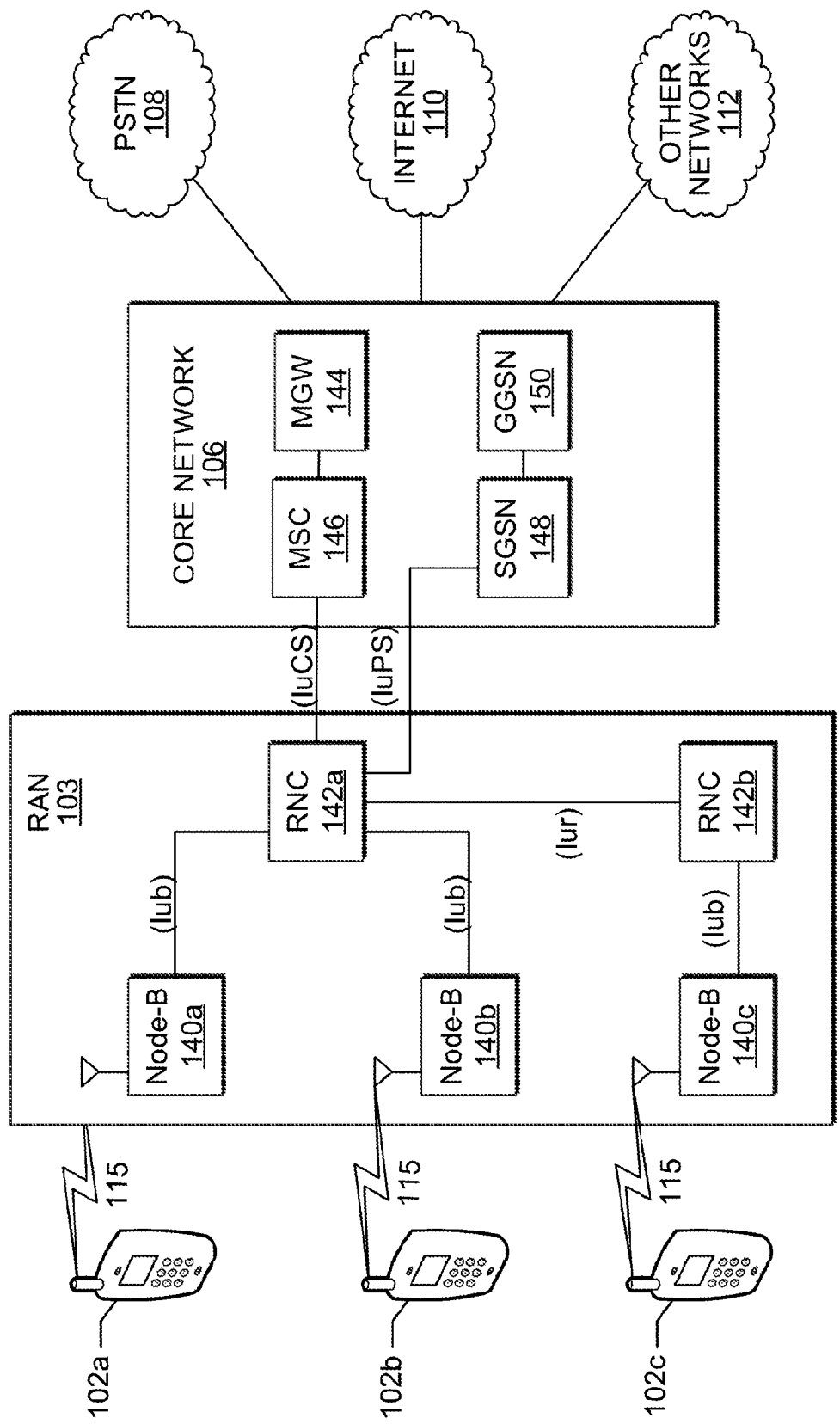
FIG. 1C depicts an example radio access network (RAN) and an example core network that may be used within the communications system of FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142*a*, 142*b* may be in communication with one another via an Iur interface. Each of the RNCs 142*a*, 142*b* may be configured to control the respective Node-Bs 140*a*, 140*b*, 140*c* to which it is connected. In addition, each of the RNCs 142*a*, 142*b* may be configured to carry out or support other functionality, such as outer-loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142*a* in the RAN 103 may be connected to the MSC 146 in the core network 106 via an IuCS interface. The MSC 146 may be connected to the MGW 144. The MSC 146 and the MGW 144 may provide the WTRUs 102*a*, 102*b*, 102*c* with access to circuit-switched networks, such as the PSTN 108, to facilitate communications between the WTRUs 102*a*, 102*b*, 102*c* and traditional landline communications devices.

The RNC 142*a* in the RAN 103 may also be connected to the SGSN 148 in the core network 106 via an IuPS interface. The SGSN 148 may be connected to the GGSN 150. The SGSN 148 and the GGSN 150 may provide the WTRUs 102*a*, 102*b*, 102*c* with access to packet-switched networks, such as the Internet 110, to facilitate communications between the WTRUs 102*a*, 102*b*, 102*c* and IP-enabled devices.

As noted above, the core network 106 may also be connected to the networks 112, which may include other wired and/or wireless networks that are owned and/or operated by other service providers.

Figure 1D:
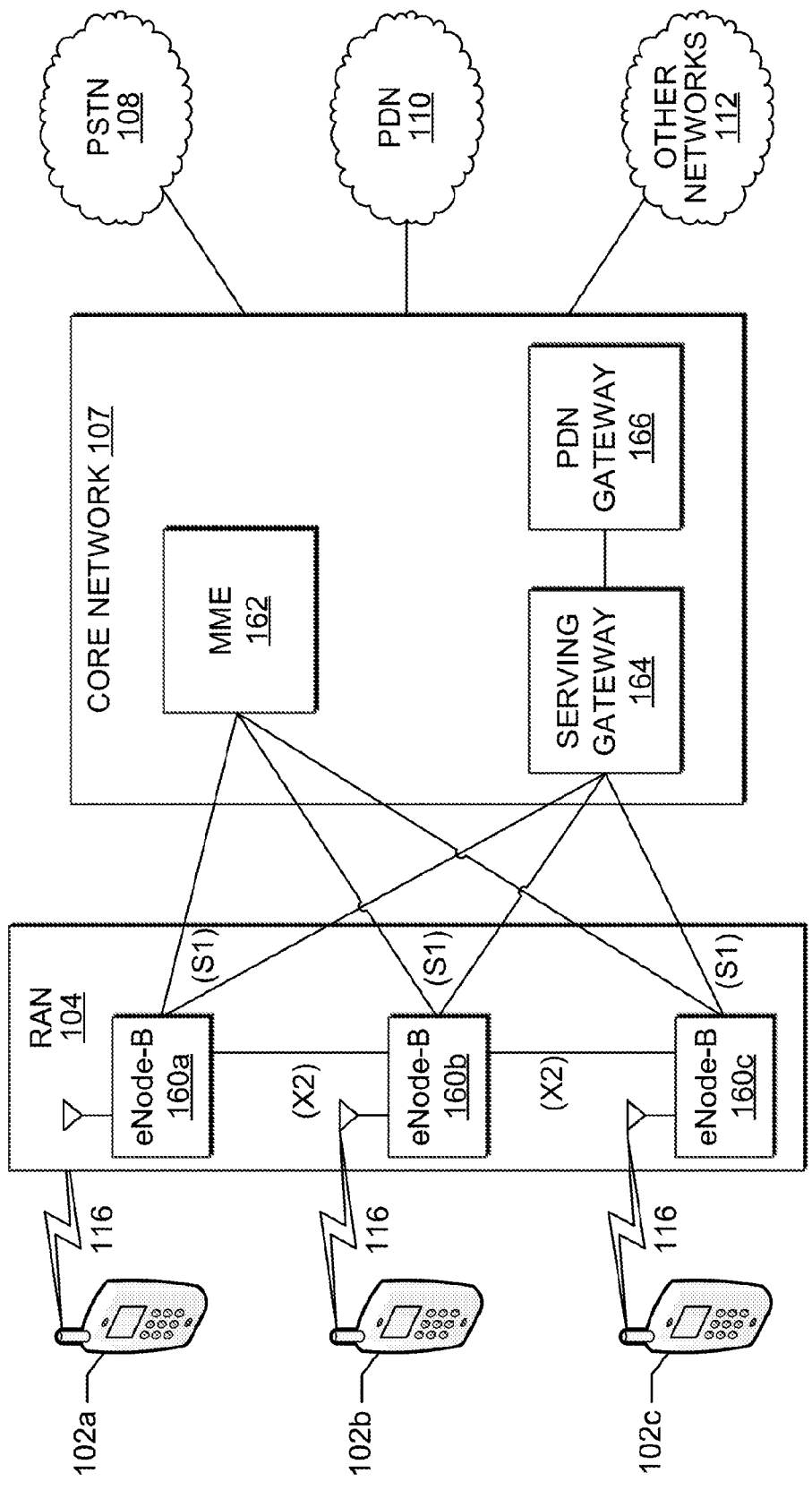
FIG. 1D depicts a second example RAN and a second example core network that may be used within the communications system of FIG. 1A.

FIG. 1D is a system diagram of the RAN 104 and the core network 107 according to an embodiment. As noted above, the RAN 104 may employ an E-UTRA radio technology to communicate with the WTRUs 102*a*, 102*b*, 102*c* over the air interface 116. The RAN 104 may also be in communication with the core network 107.

The RAN 104 may include eNode Bs 160*a*, 160*b*, 160*c*, though it will be appreciated that the RAN 104 may include any number of eNode Bs while remaining consistent with an embodiment. The eNode Bs 160*a*, 160*b*, 160*c* may each include one or more transceivers for communicating with the WTRUs 102*a*, 102*b*, 102*c* over the air interface 116. In one embodiment, the eNode Bs 160*a*, 160*b*, 160*c* may implement MIMO technology. Thus, the eNode B 160*a*, for example, may use multiple antennas to transmit wireless signals to, and receive wireless signals from, the WTRU 102*a*.

Each of the eNode Bs 160*a*, 160*b*, 160*c* may be associated with a particular cell (not shown) and may be configured to handle radio-resource-management decisions, handover decisions, scheduling of users in the uplink and/or downlink, and the like. As shown in FIG. 1D, the eNode Bs 160*a*, 160*b*, 160*c* may communicate with one another over an X2 interface.

The core network 107 shown in FIG. 1D may include a mobility management entity (MIME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode Bs 160*a*, 160*b*, 160*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may also provide a control plane function for switching between the RAN 104 and other RANs (not shown) that employ other radio technologies, such as GSM or WCDMA.

The serving gateway 164 may be connected to each of the eNode Bs 160*a*, 160*b*, 160*c* in the RAN 104 via the S1 interface. The serving gateway 164 may generally route and forward user data packets to/from the WTRUs 102*a*, 102*b*, 102*c*. The serving gateway 164 may also perform other functions, such as anchoring user planes during inter-eNode B handovers, triggering paging when downlink data is available for the WTRUs 102*a*, 102*b*, 102*c*, managing and storing contexts of the WTRUs 102*a*, 102*b*, 102*c*, and the like.

The serving gateway 164 may also be connected to the PDN gateway 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The core network 107 may facilitate communications with other networks. For example, the core network 107 may provide the WTRUs 102*a*, 102*b*, 102*c* with access to circuit-switched networks, such as the PSTN 108, to facilitate communications between the WTRUs 102*a*, 102*b*, 102*c* and traditional landline communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102*a*, 102*b*, 102*c* with access to the networks 112, which may include other wired and/or wireless networks that are owned and/or operated by other service providers.

Figure 1E:
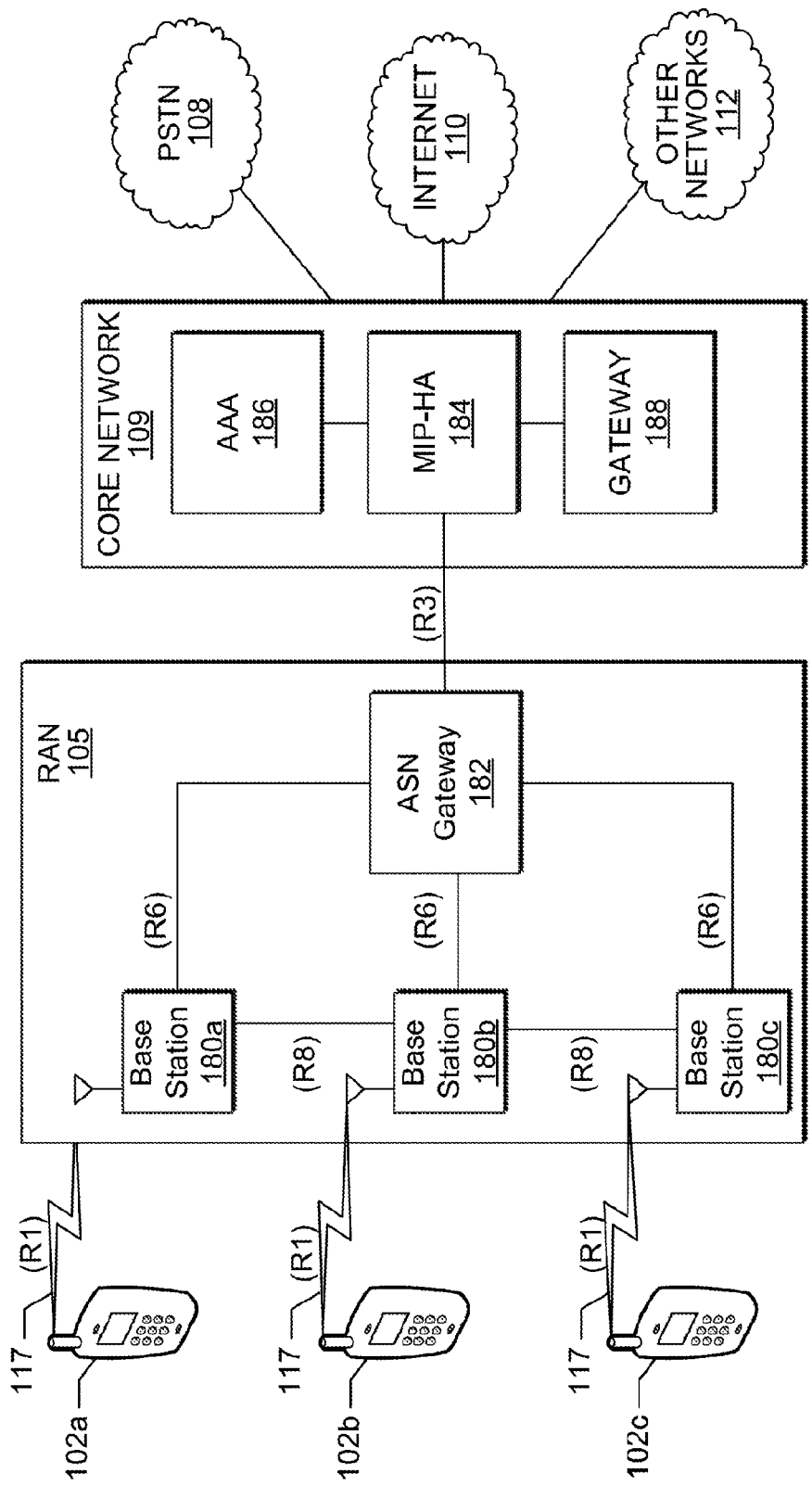
FIG. 1E depicts a third example RAN and a third example core network that may be used within the communications system of FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102*a*, 102*b*, 102*c* over the air interface 117. As will be further discussed below, the communication links between the different functional entities of the WTRUs 102*a*, 102*b*, 102*c*, the RAN 105, and the core network 109 may be defined as reference points.

As shown in FIG. 1E, the RAN 105 may include base stations 180*a*, 180*b*, 180*c*, and an ASN gateway 182, though it will be appreciated that the RAN 105 may include any number of base stations and ASN gateways while remaining consistent with an embodiment. The base stations 180*a*, 180*b*, 180*c* may each be associated with a particular cell (not shown) in the RAN 105 and may each include one or more transceivers for communicating with the WTRUs 102*a*, 102*b*, 102*c* over the air interface 117. In one embodiment, the base stations 180*a*, 180*b*, 180*c* may implement MIMO technology. Thus, the base station 180*a*, for example, may use multiple antennas to transmit wireless signals to, and receive wireless signals from, the WTRU 102*a*. The base stations 180*a*, 180*b*, 180*c* may also provide mobility-management functions, such as handoff triggering, tunnel establishment, radio-resource management, traffic classification, quality-of-service (QoS) policy enforcement, and the like.

The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point (not shown), which may be used for authentication, authorization, IP-host-configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility-management capabilities, as examples. The core network 109 may include a mobile-IP home agent (MEP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA 184 may be responsible for IP-address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional landline communications devices. In addition, the gateway 188 may provide the WTRUs 102a, 102b, 102c with access to the networks 112, which may include other wired and/or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point (not shown), which may include protocols for coordinating the mobility of the WTRUs 102a, 102b, 102c between the RAN 105 and the other ASNs. The communication link between the core network 109 and the other core networks may be defined as an R5 reference point (not shown), which may include protocols for facilitating interworking between home core networks and visited core networks.

Figure 1F:
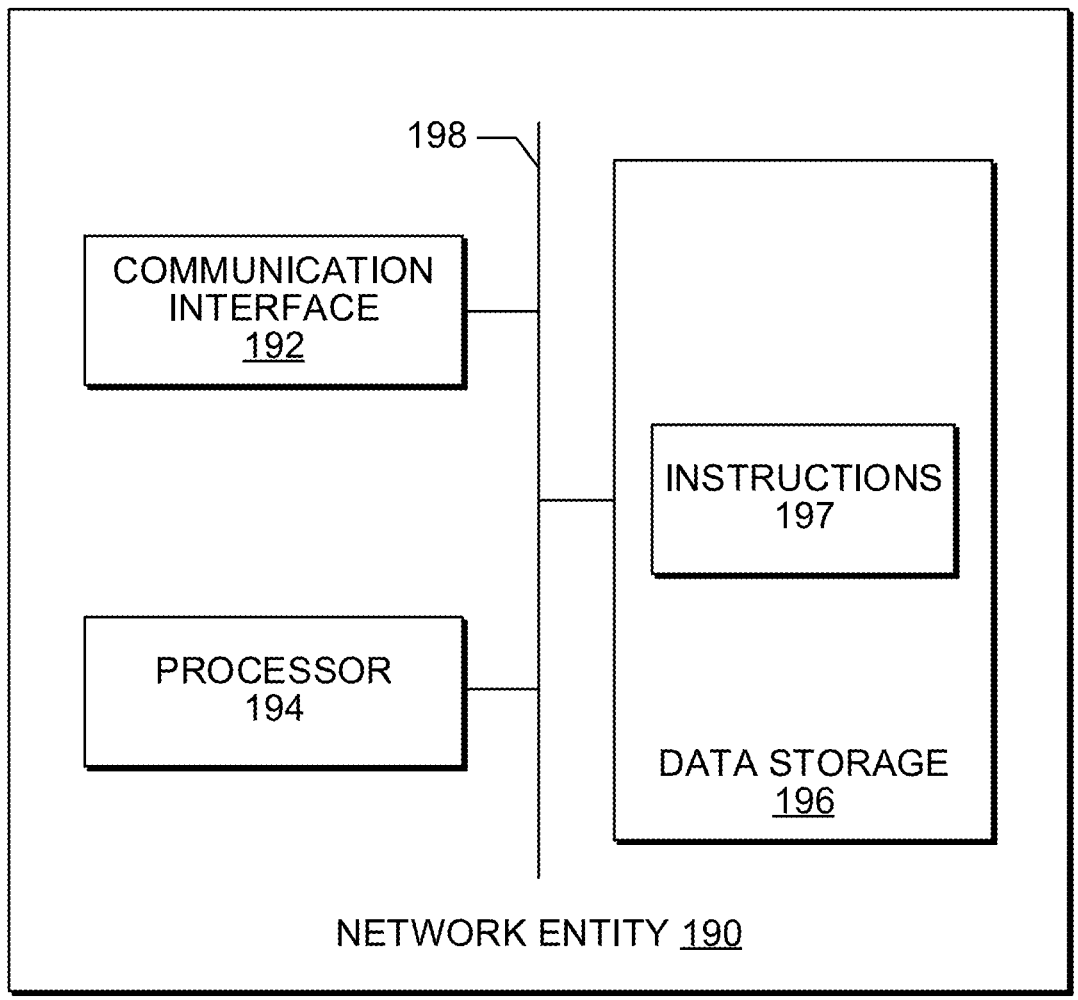
FIG. 1F depicts an example network entity that may be used within the communication system of FIG. 1A.

FIG. 1F depicts an example network entity 190 that may be used within the communication system 100 of FIG. 1A.

As depicted in FIG. 1F, network entity 190 includes a communication interface 192, a processor 194, and non-transitory data storage 196, all of which are communicatively linked by a bus, network, or other communication path 198.

Communication interface 192 may include one or more wired communication interfaces and/or one or more wireless-communication interfaces. With respect to wired communication, communication interface 192 may include one or more interfaces such as Ethernet interfaces, as an example. With respect to wireless communication, communication interface 192 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 192 may be equipped at a scale and with a configuration appropriate for acting on the network side—as opposed to the client side—of wireless communications (e.g., LTE communications, Wi Fi communications, and the like). Thus, communication interface 192 may include the appropriate equipment and circuitry (perhaps including multiple transceivers) for serving multiple mobile stations, UEs, or other access terminals in a coverage area.

Processor 194 may include one or more processors of any type deemed suitable by those of skill in the relevant art, some examples including a general-purpose microprocessor and a dedicated DSP.

Data storage 196 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art could be used. As depicted in FIG. 1F, data storage 196 contains program instructions 197 executable by processor 194 for carrying out various combinations of the various network-entity functions described herein.

In some embodiments, the network-entity functions described herein are carried out by a network entity having a structure similar to that of network entity 190 of FIG. 1F. In some embodiments, one or more of such functions are carried out by a set of multiple network entities in combination, where each network entity has a structure similar to that of network entity 190 of FIG. 1F. In various different embodiments, network entity 190 is—or at least includes—one or more of (one or more entities in) RAN 103, (one or more entities in) RAN 104, (one or more entities in) RAN 105, (one or more entities in) core network 106, (one or more entities in) core network 107, (one or more entities in) core network 109, base station 114a, base station 114b, Node B 140a, Node B 140b, Node B 140c, RNC 142a, RNC 142b, MGW 144, MSC 146, SGSN 148, GGSN 150, eNode B 160a, eNode B 160b, eNode B 160c, MME 162, serving gateway 164, PDN gateway 166, base station 180a, base station 180b, base station 180c, ASN gateway 182, MIP HA 184, AAA 186, and gateway 188. And certainly other network entities and/or combinations of network entities could be used in various embodiments for carrying out the network-entity functions described herein, as the foregoing list is provided by way of example and not by way of limitation.

Exemplary Systems and Methods.

Systems and methods are disclosed herein for high reliability transmission with superposition modulation aided network coding. In particular, the systems and methods disclosed herein can be described as follows.

In at least one embodiment, the systems and methods disclose a scheme that combines wireless physical network coding (WPNC) together with superposition modulation to support a highly reliable transmission. One feature of exemplary embodiments is the use of a composite constellation for carrying the side information that avoids use of extra resources. Some embodiments described herein implement a WPNC-based relay network without the use of extra resources in time or frequency to facilitate side information ("SI"). While SI may be used to improve the transmission reliability in a WPNC arrangement, a direct usage of extra physical resources for SI transmission degrades the overall spectral efficiency of the system.

In at least one embodiment, the systems and methods disclose a new approach for constructive combining of least-significant bits (LSBs) of the received symbols through constellation rotation to ensure a robust performance for dissemination of $P_{SI}$.

In at least one embodiment, to overcome the inefficiency problem mentioned earlier, a WPNC-based transmission scheme for enhancing the reliability of a point-to-multipoint system, e.g., downlink of a cellular system, is introduced where the SI is disseminated through the use of superposition modulation. Since no extra physical resources are spent to support SI, a higher overall spectral efficiency can be achieved. The proposed design exploits diversity through the receiver combining to improve the reliability of SI transmission and compensate for the limited power available in a superposition modulation process.

Figure 2:
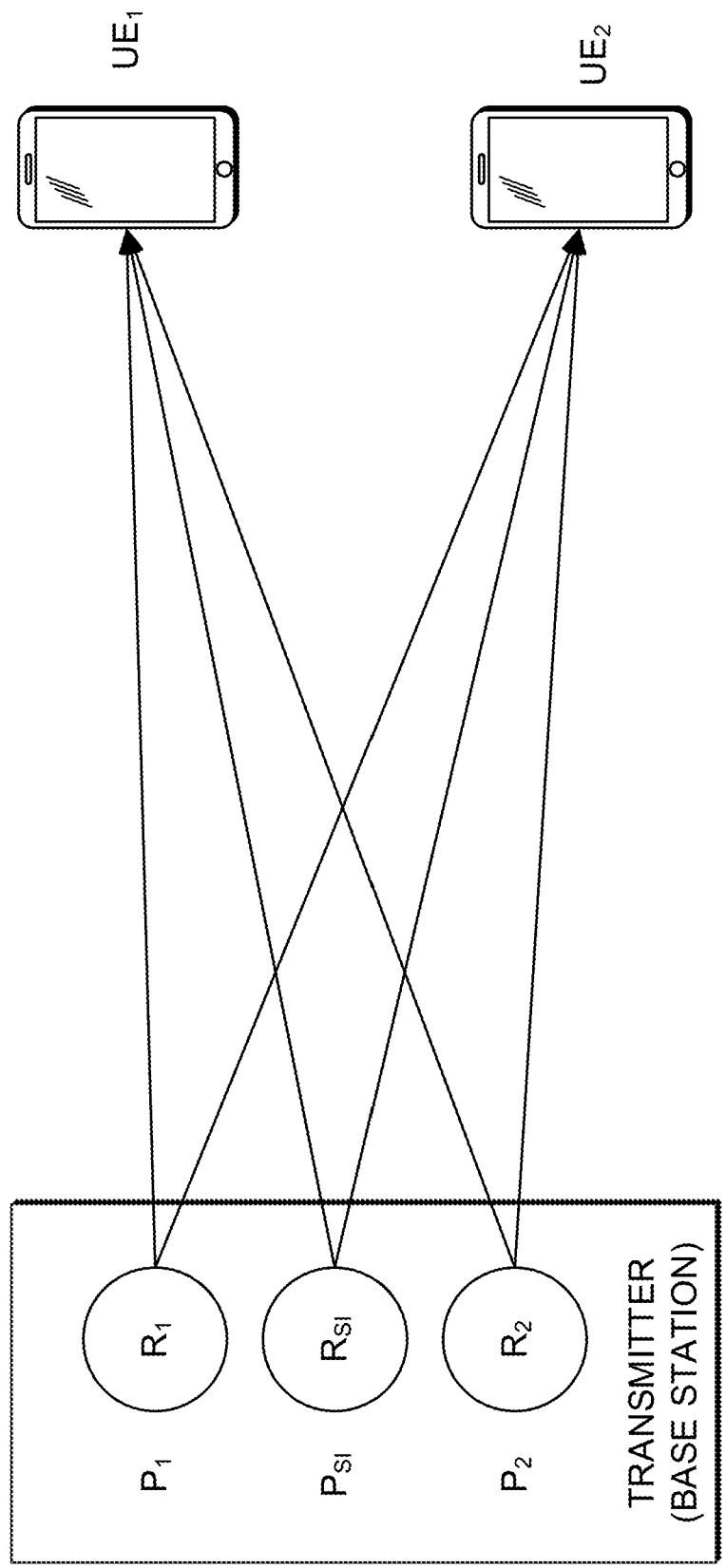
FIG. 2 is a schematic illustration providing an overview of an exemplary embodiment.

FIG. 2 depicts a basic system model, in accordance with some embodiments. In particular, FIG. 2 shows an overview of the proposed system where the base station attempts to communicate equal size packets $P_1$ and $P_2$ to a pair of users $UE_1$ and $UE_2$ on $R_1$ and $R_2$ resources, respectively. $R_1$ and $R_2$ can be assumed as time or frequency resources, such that transmission using $R_1$ and $R_2$ involves transmission at separate times and/or at different frequencies. For purposes of illustration, and without loss of generality, the transmissions of $R_1$ and $R_2$ are described as being at different frequencies.

In at least one embodiment, the side information packet $P_{SI}$ is essentially the bit-level XOR-ed of the main packets $P_1$ and $P_2$. Since $P_{SI}$ may be used for the recovery of either of main packets, it may be broadcast to both UE's using $R_{SI}$ resources.

In at least one embodiment, superposition modulation is introduced as an alternative approach to facilitate the availability of SI and enhance the overall reliability of the system without consuming $R_{SI}$ resources. In exemplary embodiments, transmitted waveforms are designed so as to carry user packets as well as SI via superposition modulation. Therefore, the SI is embedded in the same transmitted symbols and resources that are used for transmission of the main packets without requiring the additional resources for $R_{SI}$.

In at least one embodiment, since the main premise of WPNC is on independent error events in each link, a resource scheduler in the base station assigns $R_1$ and $R_2$ such that they are sufficiently distanced in frequency to ensure independent fading events. Therefore, following the principles of WPNC, in the event of a severe outage experienced by a user, the impacted user would attempt to decode the other user packet and the SI towards recovery of its own packet. Since SI is always available for either link, this approach can be considered a preemptive measure to counter link outage.

Figure 3:
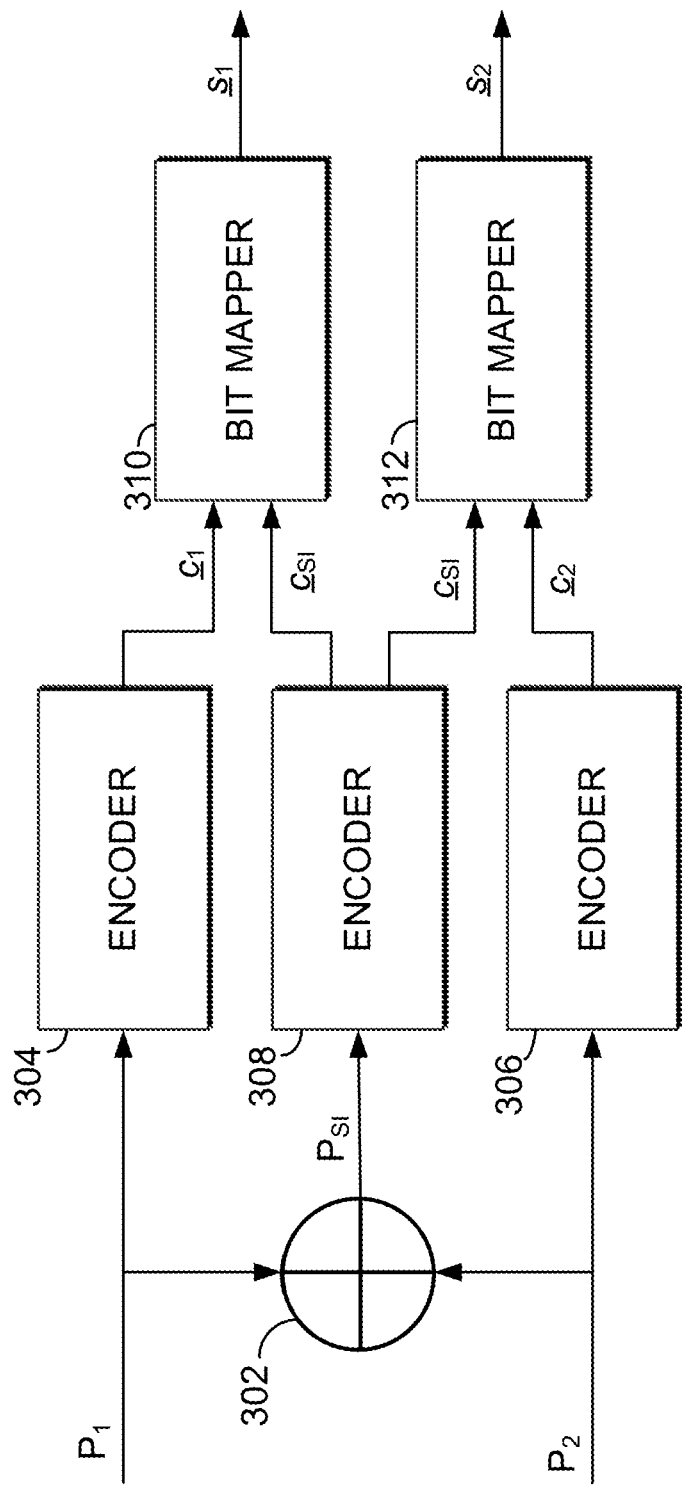
FIG. 3 is a functional block diagram of a transmitter architecture, in accordance with some embodiments.

An exemplary WPNC encoding step is described with respect to FIG. 3. FIG. 3 depicts a transmitter architecture, in accordance with some embodiments. In particular, FIG. 3 shows the transmitter processing components for transmission of equal size packets $P_1$ and $P_2$ to a pair of users $UE_1$ and $UE_2$.

In at least one embodiment, equal length packets $P_1$, $P_2$ are combined by bitwise XOR logic 302 (or other combination function) to generate side information packet $P_{SI}=P_1 \oplus P_2$. The packets $P_1$, $P_2$ and $P_{SI}$ are encoded independently by respective encoders 304, 306, 308, at a code rate $r_c$ to produce the coded bit sequences $\underline{c}_i$, $i \in \{1,2, SI\}$. The generated coded streams are fed to bit mapper functions 310, 312 to produce the transmit symbols for $UE_1$ and $UE_2$. To prevent a loss in the spectral efficiency of the system, in at least one embodiment, superposition modulation is employed. As such, all three coded bit sequences $\underline{c}_i$, $i \in \{1,2, SI\}$ are transmitted through construction of a composite constellation and use of only two resources.

The superposition modulation may be performed using a constellation as described below. In at least one embodiment, a composite constellation can be obtained by appropriately combining of two uniform m-QAM constellations, $$s_i = \sqrt{1-\alpha}x_1 + \sqrt{\alpha}x_2 \qquad (1)$$

where $x_1$ and $x_2$ are the constituent complex symbols and the parameter $0 \leq \alpha \leq 1$ represents the power split between the two principal constellations. In a uniform constellation, the distance between adjacent constellation points are assumed equal.

Figure 4A:
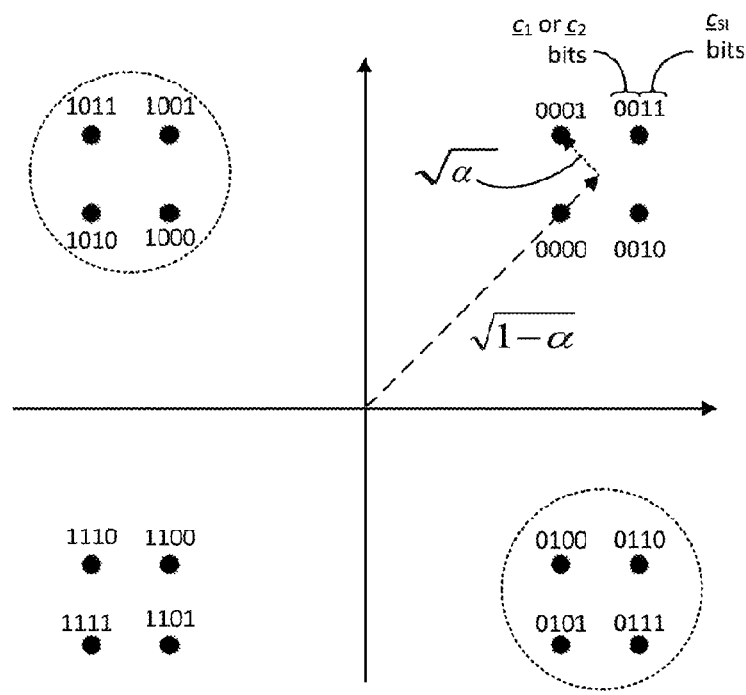
FIG. 4A depicts a composite constellation with gray mapping, in accordance with some embodiments.

FIG. 4A depicts an exemplary composite constellation with gray mapping, in accordance with some embodiments. In particular, FIG. 4A shows a composite constellation resulting from the superposition of two lower modulated 4-QAM signals. Depending on the choice of $\alpha$, the constellation can be a uniform or a non-uniform composite constellation. The second constellation (used to modulate the least significant bits in some embodiments) may be referred to as a sub-constellation.

Figure 4B:
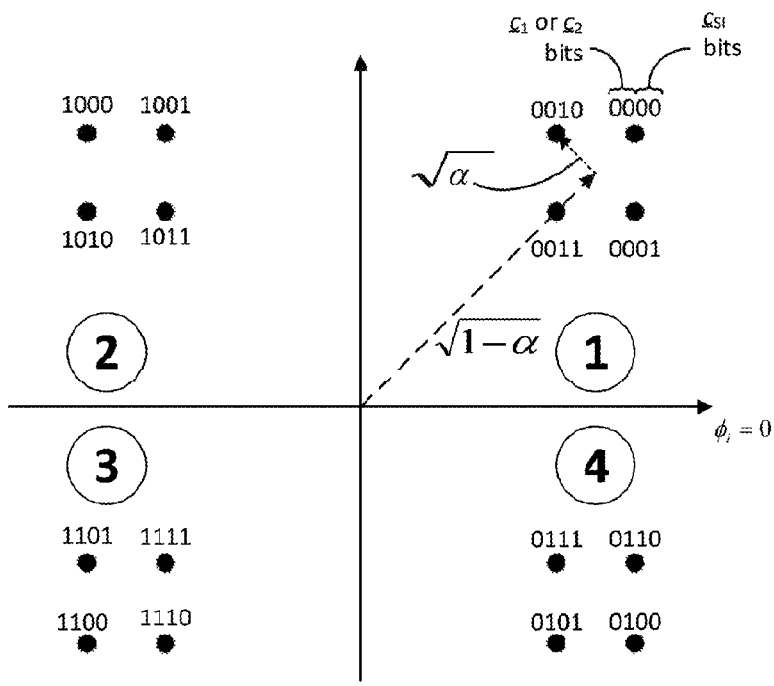
FIG. 4B depicts a composite constellation and mapping, in accordance with some embodiments.

FIG. 4B depicts composite constellation and mapping, in accordance with some embodiments. In particular, FIG. 4B shows rotation-based received signal combining. For the example mapping scheme, as shown in FIG. 4B, signal combining can be performed by appropriate received signal rotation as described below.

In at least one embodiment,
(i) the equalized received signal ($\bar{y}_i$) is represented using polar coordinates, i.e., $\bar{y}_i = r_i e^{\Im \phi_i}$, $i \in \{1,2\}$, $0 \leq \phi_i \leq 2\pi$, $r_i > 0$ where $\Im = \sqrt{-1}$. As given in Table 1, based on the range of $\phi_i$, the quadrant label $Q^{(i)} \in \{1,2,3,4\}$ is assigned to $\bar{y}_i$ (cf. FIG. 4B).

TABLE 1

Quadrant labeling

| $\phi_i$ range | $Q^{(i)}$, i ∈ {1, 2} |
| --- | --- |
| $0 < \phi_i < \pi/2$ | 1 |
| $\pi/2 < \phi_i < \pi$ | 2 |
| $\pi < \phi_i < 3\pi/2$ | 3 |
| $3\pi/2 < \phi_i < 2\pi$ | 4 |

(ii) next, the rotation mechanism is applied on the received signal $y_j$ as $$\bar{y}_j = y_j e^{\Im(Q^{(i)} - Q^{(j)})\frac{\pi}{2}}.$$

(iii) finally, the combined signal can be obtained by (5), i.e., $y_{i,COMB} = \bar{\bar{y}}_i + \bar{\bar{y}}_j$.

Figure 5:
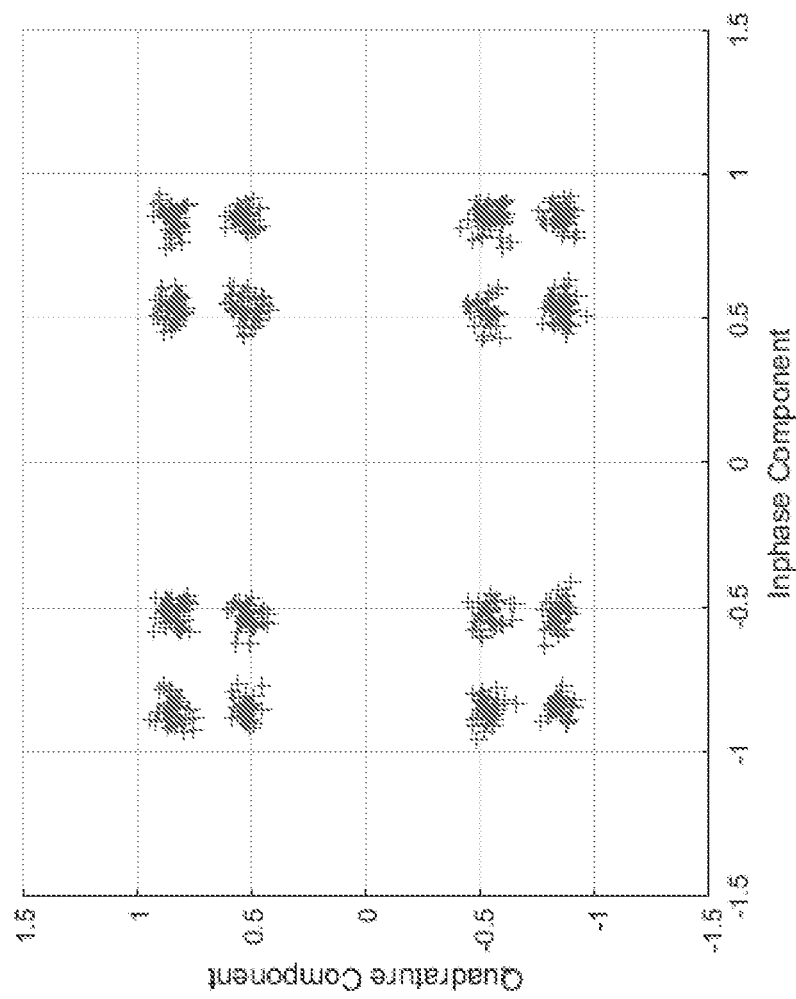
FIG. 5 depicts composite constellation with $\alpha=0.05$, in accordance with some embodiments.

FIG. 5 depicts composite constellation with α=0.05, in accordance with some embodiments. In particular, FIG. 5 shows a non-uniform composite constellation with power split factor of α=0.05 resulting from superposition modulation of two 4-QAM constellations. In at least one embodiment, a proper trade-off for a is selected to ensure an acceptable level of performance for each link. Upon the selection of a and the primary modulations, the design of the composite constellation is complete.

In at least one embodiment, to implement superposition modulation in the system, an $m_c^{(MSB)}$ number of bits from $c_i$, $i \in \{1,2\}$ and a $m_c^{(LSB)}$ number of bits from $c_{SI}$ are grouped together to form a complex symbol. The created composite constellation has a size of $M=2^{(m_c^{(MSB)}+m_c^{(LSB)})}$ symbols where the $m_c^{(MSB)}$ and $m_c^{(LSB)}$ bits are mapped onto the most significant bits (MSB) and the least significant bits (LSB) of each transmitted symbol, respectively. The selection of $m_c^{(MSB)}$ and $m_c^{(LSB)}$ depends on the choice of the adopted base modulation orders.

In an exemplary embodiment, if it is desired to construct a 16 point composite constellation from two lower order 4-QAM constellations, then $m_c^{(MSB)}=m_c^{(LSB)}=2$. In this case, the bits of the coded sequences $c_i$, $i \in \{1,2\}$ select the quadrant of a transmitted symbol, while the bits from $c_{SI}$ determines the exact location of the transmitted symbol within each quadrant. It is worth noting that to increase the robustness of the transmission, the SI packet may be sent at a lower code rate using a selection of parameters such that $m_c^{(LSB)} > m_c^{(MSB)}$. For example, it may be desirable to employ 16-QAM and 4-QAM modulations as the constituent constellations for transmission of $P_{SI}$ and $P_i$, $i \in \{1,2\}$, respectively.

Figure 6:
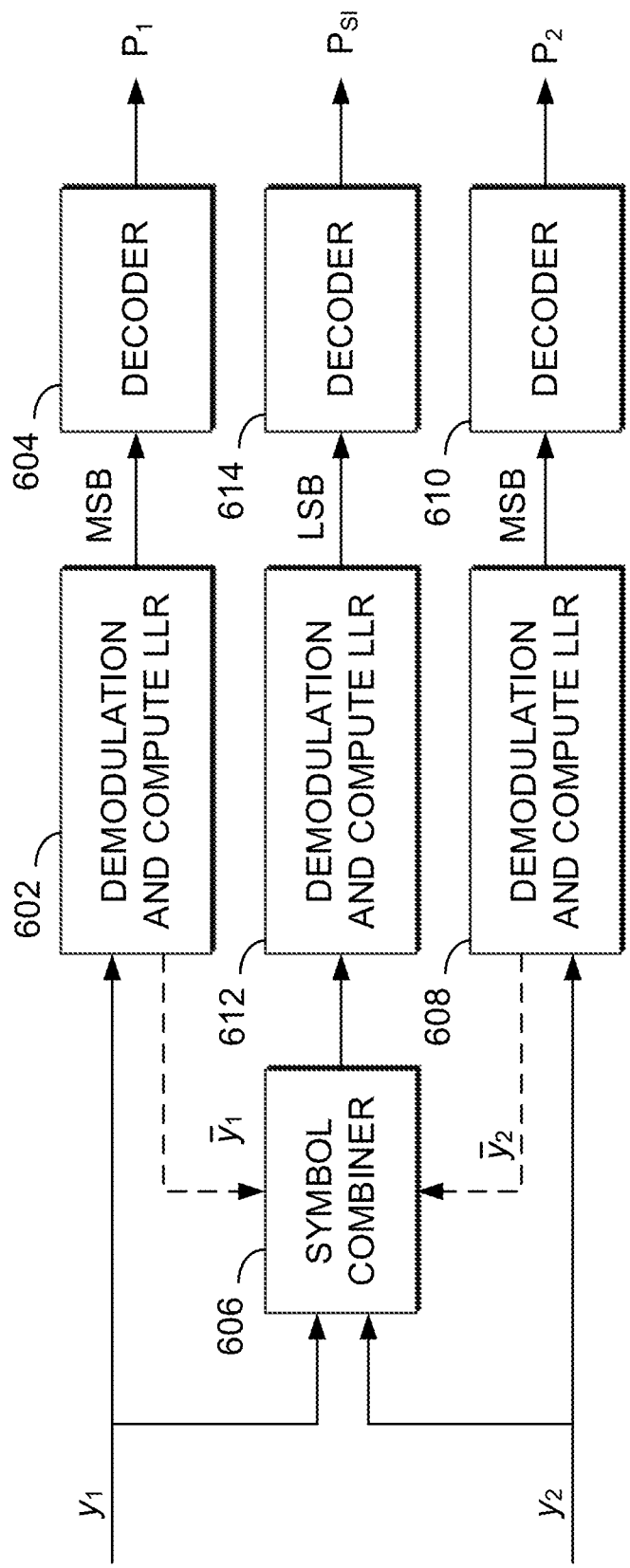
FIG. 6 depicts a receiver architecture, in accordance with some embodiments.

The receiver processing for signal combining step is described with respect to FIG. 6. FIG. 6 depicts a receiver architecture, in accordance with some embodiments. In particular, FIG. 6 shows the general structure of a receiver where $y_i$, $i=1,2$ represent the received signals on resource $R_i$. At block 602, $y_1$ is demodulated and the most significant bits of the symbol encoded by $y_1$ is supplied to a decoder 604. An equalized version of $y_1$, namely $\bar{y}_1$, is supplied to a symbol combiner 606. Similarly, at block 608, $y_2$ is demodulated and the most significant bits of the symbol encoded by $y_2$ is supplied to a decoder 610. An equalized version of $y_2$, namely $\bar{y}_2$, is supplied to the symbol combiner 606. The symbol combiner 606 operates to reconstruct the side-information constellation from both of received signals and provides the reconstructed constellation to be demodulated at 612. The demodulation at 612 recovers the least significant bits encoded in both of the received signals and provides that least significant bits to a decoder 614.

In at least one embodiment, in a given symbol period, the received signal $y_i$ can be written as $$y_i = h_i s_i + n_i, \quad i=1,2 \quad (2)$$

where $s_i$ is the composite transmitted symbol, $h_i$ represents the channel fading coefficient and $n_i$ is the receiver additive white Gaussian noise (AWGN).

As described above, the information pertaining to $P_1$ and $P_2$ are transmitted using the MSB of the transmitted symbol. Therefore, it could be expected that it is less likely to make an error in decoding $P_1$ and $P_2$ than $P_{SI}$ that relies on a transmission with smaller Euclidean distance. However, since $c_{SI}$ is transmitted on $R_1$ and $R_2$ resources, the $c_{SI}$ received from the two channels can be combined to be compensate for being sent over constellation points with the smaller Euclidean distance.

In at least one embodiment, to exploit the diversity benefit of independent fades, received signals are pre-processed prior to the decoding. In an exemplary embodiment, the received signals $y_i$, $i \in \{1,2\}$ are equalized, $$\bar{y}_i = h_i^* y_i \quad (3)$$
$$= |h_i|^2 s_i + h_i^* n_i, \quad i \in \{1,2\}$$

where $(.)^*$ denotes the conjugate operation and $|.|$ represents the magnitude of a complex number. However, since the MSB of the two transmitted symbols $s_1$ and $s_2$ are not the same, a direct addition of the received signals is not possible.

To overcome this issue, in at least one embodiment, a phase correction on one of the received symbols is performed prior to the combining. To facilitate the description, the case where the constituent constellations are both 4-QAM is described. However, the presented approach can be modified to other combinations as well. As shown in FIG. 4B, the employed gray bit mapping rule allows signal combining of LSB information from different quadrants. Therefore, it is possible to combine the soft information of LSB of $s_1$ and $s_2$ without requiring similar MSBs. Therefore, after channel equalization of the received signal, the quadrant of the transmitted symbol $s_i$, $i \in \{1,2\}$ can be determined correctly with a relatively high probability. Then, the detected quadrant is rotated to allow a constructive signal combing of soft LSBs of $s_1$ and $s_2$.

In at least one embodiment, the rotation mechanism needs to be performed on only one of the received symbols, and it can be expressed as follows, $$\bar{\bar{y}}_j = \text{Sgn}(\text{Re}(\bar{y}_i))\text{Sgn}(\text{Re}(\bar{y}_j))\text{Re}(\bar{y}_j) + \quad (4)$$
$$\Im \text{Sgn}(\text{Im}(\bar{y}_i))\text{Sgn}(\text{Im}(\bar{y}_j))\text{Im}(\bar{y}_j) \quad i,j \in \{1,2\}, \quad i \neq j$$

where $\Im = \sqrt{-1}$, and $\text{Sgn}(x)$, $\text{Re}(.)$ and $\text{Im}(.)$ represents sign, real and imaginary functions, respectively. After the rotation, the combined signal $y_{i,COMB}$ can finally be computed as $$y_{i,COMB} = \bar{\bar{y}}_i + \bar{\bar{y}}_j. \quad (5)$$

The example of phase correction (rotation) as described above is one technique that may be used to align composite-constellation symbols so that the aligned symbols can be added to obtain the side-information constellation. However, it should be noted that other alignment techniques may alternatively be employed. For example, in some embodiments (e.g. where the side-information constellation is not rotated in different quadrants with respect to the primary constellation), different composite-constellation symbols may be aligned by shifting the symbols in the in-phase (real) and/or quadrature (imaginary) directions.

Due to the diversity, it can be expected that the symbol-level combining of the received signals from the two channels exhibit a significant boost to the detection performance of $P_{SI}$ despite being mapped onto the constellation points with less Euclidean distance.

An exemplary WPNC decoding procedure is described. In at least one embodiment, $UE_1$ attempts to decode $c_1$. In the event of a decoding error, $UE_1$ embarks on decoding $c_2$ and $c_{SI}$. If decoding of $c_2$ and $c_{SI}$ were successful, $UE_1$ proceeds to recover $P_1$ from successfully decoded $P_2$ and $P_{SI}$ packets. However, in case of an error event in decoding of either $P_2$ or $P_{SI}$, in at least one embodiment, $UE_1$ declares the packet $P_1$ as a lost packet. Successful deployment of WPNC is most advantageous when error events for $P_1$, $P_2$ and $P_{SI}$ packets are uncorrelated.

Assuming perfectly uncorrelated error events between the three transmissions, a probability of block error rate can be computed to serve as an upper bound of the performance. Let $p_e^{(i)}$, $i=\{1,2, SI\}$ denote the probability that packet $P_i$ is decoded erroneously.

In at least one embodiment, the probability that $P_i$ is recovered correctly, after applying WPNC, $p_{c,NC}^{(i)}$, can be simply stated as $$p_{c,NC}^{(i)} = 1 - p_e^{(i)} + p_e^{(i)}(1 - p_e^{(j)})(1 - p_e^{(SI)}), \quad (6)$$
$$i, j \in \{1, 2\}, \quad i \neq j$$

Hence, the probability of error of $P_i$, i.e., $p_{e,NC}^{(i)}=1-p_{c,NC}^{(i)}$, that is $$p_{e,NC}^{(i)} = p_e^{(i)}(p_e^{(j)} + p_e^{(SI)} - p_e^{(j)}p_e^{(SI)}) \quad (7)$$

which can be further approximated by $$p_{e,NC}^{(i)} \approx p_e^{(i)}(p_e^{(j)} + p_e^{(SI)}). \quad (8)$$

Therefore, since the likelihood of simultaneous error events is not high, it is possible to benefit from the availability of SI through WPNC process and to enhance the link overall reliability significantly.

In an exemplary embodiment, Table 2 shows a summary of simulation assumptions for evaluation of the proposed transmission scheme.

TABLE 2

| Parameter | Value |
| --- | --- |
| Encoder | 1/3 Convolution code $g_1 = 133$, $g_2 = 171$, $g_3 = 165$ (Octal), constraint length 6 |
| Block length | 100 information bits |
| Channel | Independent Rayleigh flat |
| Number of fading events/frame (B) | 1 |
| α | 0.05 |
| $m_c^{(MSB)} = m_c^{(LSB)}$ | 2 (i.e., M = 16) |
| Bit mapping | Gray mapping |
| LLR computation | Approximate log-likelihood ratio |

The overall model used for the performance evaluation is based on the general model shown in FIG. 2, with the exception that instead of transmission of $P_{SI}$ over $R_{SI}$ resources, superposition modulation for the transmission of $P_{SI}$ is employed.

In at least one embodiment, for any given UE, channel coefficients $h_1$ and $h_2$ corresponding to the resources $R_1$ and $R_2$ are generated independently. The baseline modulations for each link are assumed 4-QAM that with α=0.05 result in a 16 point composite constellation.

In at least one embodiment, the value of a is chosen so as to support a relatively similar range of performance for $P_1$, $P_2$ and $P_{SI}$ transmission. An extreme selection of α would sway the power to one of the constituent constellations that leads to severe degradation of overall performance.

Figure 7A:
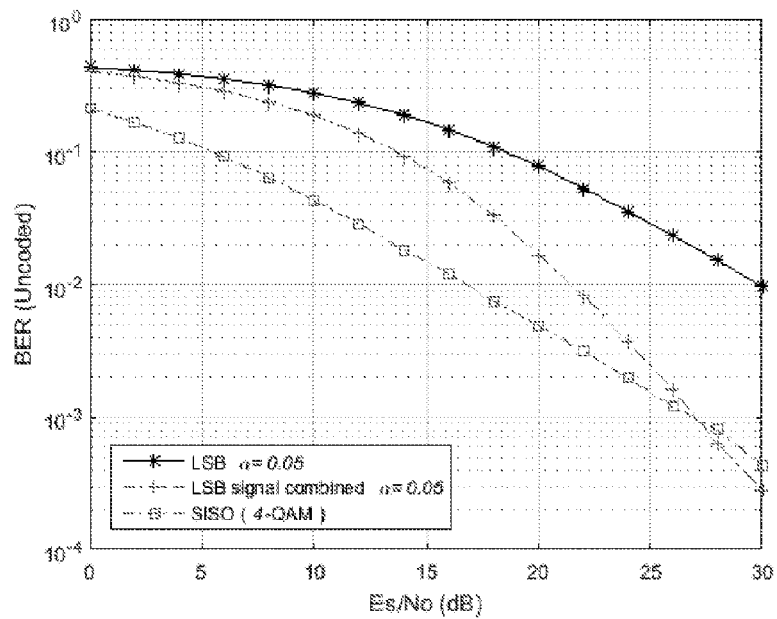
FIG. 7A is a graph depicting un-coded BER performance for $\alpha=0.05$ in accordance with some embodiments.
Figure 7B:
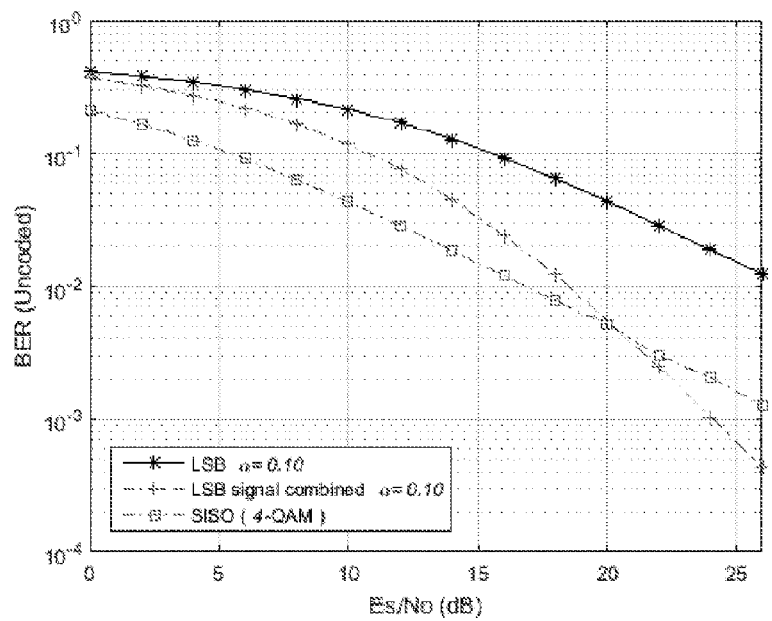
FIG. 7B is a graph depicting un-coded BER performance for $\alpha=0.10$ in accordance with some embodiments.

FIGS. 7A-7B depict un-coded BER performance for α=0.05 (FIG. 7A) and α=0.10 (FIG. 7B) in accordance with some embodiments. In FIGS. 7A-7B, the un-coded BER performance of the LSB bits of the composite constellation with and without the proposed combining are compared against the baseline 4-QAM transmission. FIGS. 7A and 7B, show the un-coded BER performance for two different values of α=0.05 and α=0.10, respectively.

In at least one embodiment, the performance of SI transmission improves as a increases. The figures illustrate that the proposed combining of the received signals results in a significant gain that even exceeds the performance of the baseline 4-QAM at higher signal-to-noise ratio range. Another feature of the presented results in FIGS. 7A-B is the higher slope of the combined signal that indicates the achieved diversity gain through combining.

Figure 8A:
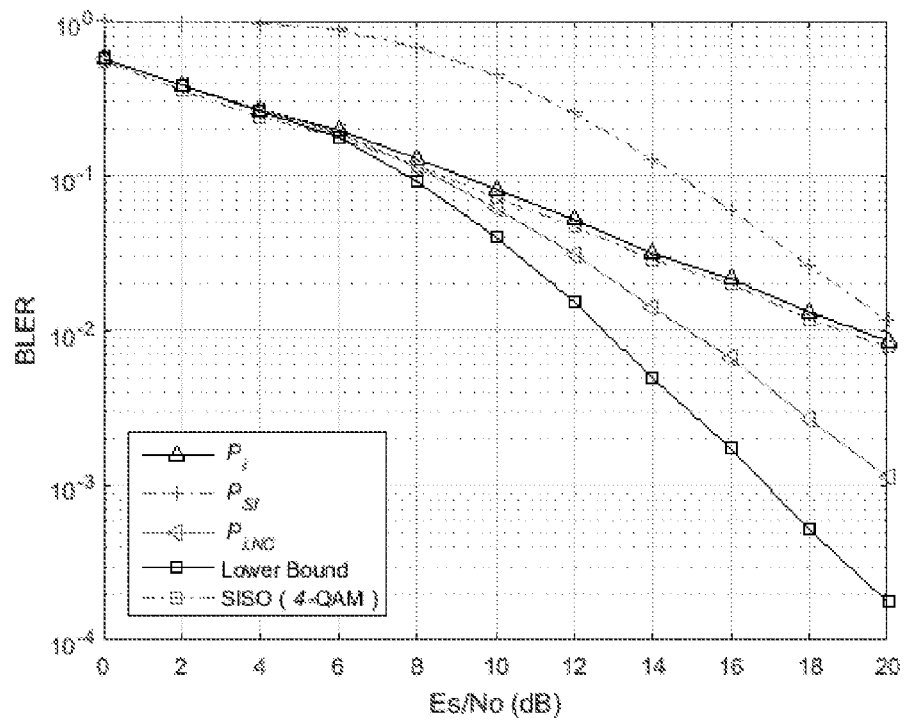
FIG. 8A is a graph depicting BLER performance for $\alpha=0.05$ in accordance with some embodiments.
Figure 8B:
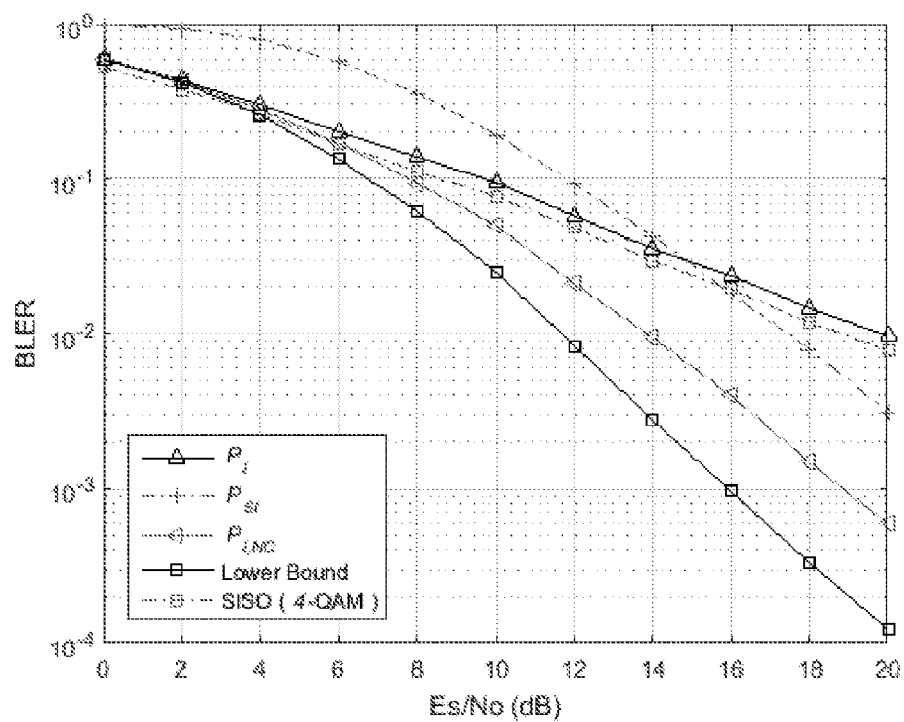
FIG. 8B is a graph depicting BLER performance for $\alpha=0.10$ in accordance with some embodiments.

FIGS. 8A-8B depict BLER performance for α=0.05 (FIG. 8A) and α=0.10 (FIG. 8B) in accordance with some embodiments. In particular, FIGS. 8A-8B show the block error rate (BLER) performance of the overall proposed system for two different values of α=0.05 and α=0.10, respectively. The legend entries $P_{i,NC}$ and $P_i$ indicate the error performance of packet $P_i$ with and without WPNC, respectively. For comparison, the performance of the baseline 4-QAM transmission is included as well.

In at least one embodiment, using power split parameters of α=0.05 and α=0.10, the achieved performance gains are about 4 and 6 dB compared to the baseline 4-QAM transmission for BLER target performance of $10^{-2}$, respectively. In the figure, the legend entry "Lower Bound" depicts the predicted lower bound performance $p_{e,NC}^{(i)}$ expressed by Eq. (8) as a reference for comparison.

Figure 9:
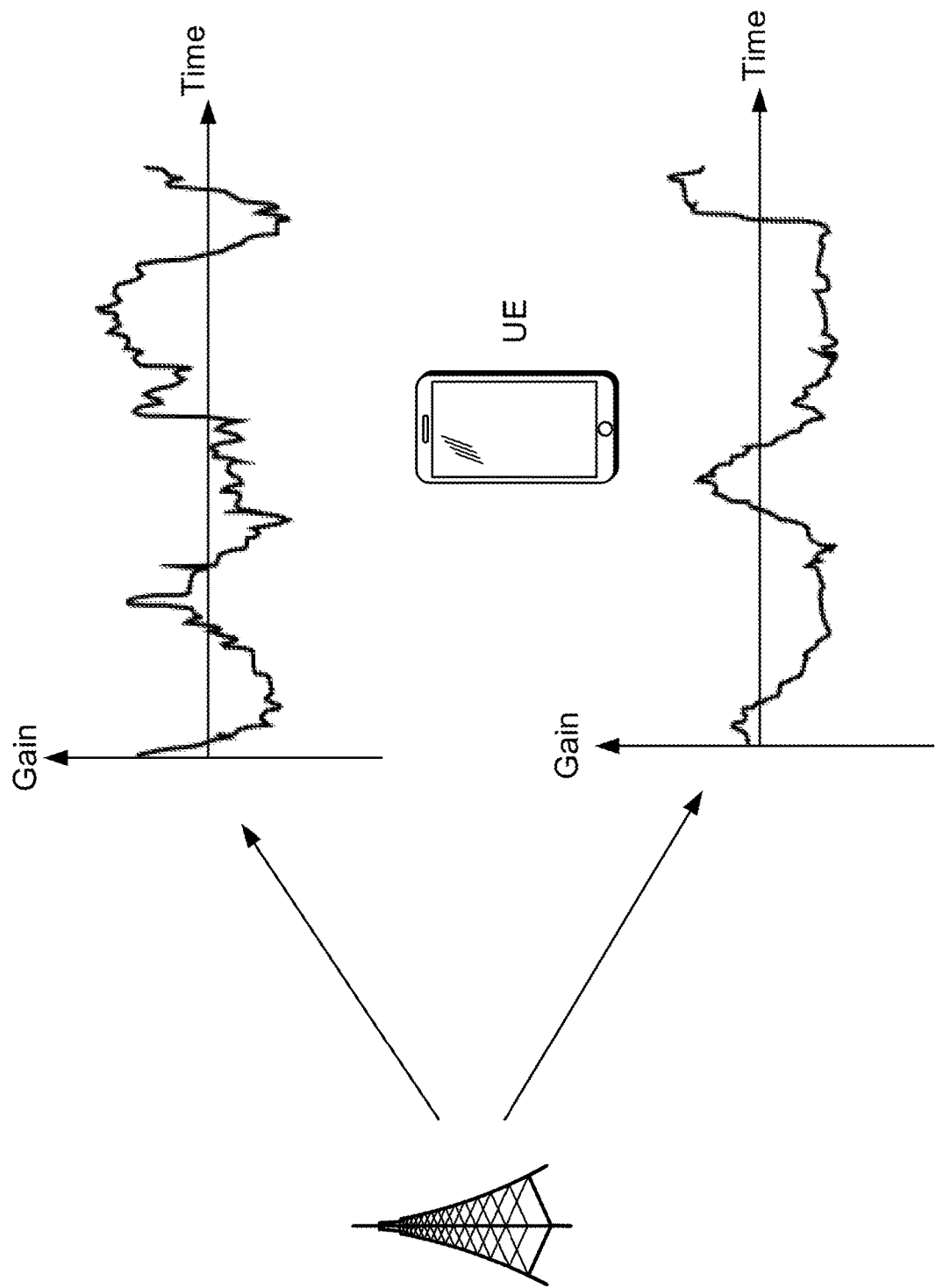
FIG. 9 is a schematic illustration of an overview of an exemplary embodiment using MIMO and multi-stream transmission.

In additional embodiments, the MIMO, multi-stream transmission and multi-user superposition transmission (MUST) configurations are configured to utilize the superposition modulation signaling described above. FIG. 9 depicts a graphical representation of a MIMO and multi-stream transmission, in accordance with some embodiments. In particular, FIG. 9 shows a typical downlink scenario where a base station ("BS") transmits multiple independent information streams to the UE.

In one such embodiment, a method is provided for transmitting at least a first data packet, a second data packet, and a third data packet. The first data packet and the side information are encoded as a first set of symbols in a composite constellation, wherein the composite constellation includes a side-information constellation for encoding the third data packet superimposed on a primary constellation for encoding the first data packet information. The second data packet and the side information are encoded as a second set of symbols in the composite constellation, where the side-information constellation is used for encoding the third data packet and the primary constellation is used for encoding the second data packet. The first set of symbols and the second set of symbols are transmitted using different transmission resources. A UE may receive the first and second sets of symbols and recover the third data packet by a method that includes aligning and combining the first and second sets of symbols.

In some such embodiments, the first, second, and third data packets are intended to be received by three different respective UEs, allowing three packets to be transmitted using two physical resources. In other embodiments, the packets may be allocated differently, e.g. with all three packets being sent to the same UE, or with any two of the packets being sent to a first UE and the remaining packets being sent to a second UE.

In at least one embodiment, the composite constellation symbols are transmitted. The LSB of the composite constellation carries an additional bit stream. The LSB signal combining may be performed at the destination receiver (UE) to enhance the performance.

In alternative embodiments, the additional information bit stream (via LSBs) can be used as follows:
a. Virtual layer support: The LSBs may carry new information bits of the same UE without using any additional physical resources, i.e., a virtual layer. This scheme can potentially increase the throughput of the UE. Note that the code rate ($r_c$) of the virtual layer can be different from other streams, thus providing design flexibility.
b. Ultra-latency applications: In some embodiments, the LSBs may be used to transmit redundancy/parity bits. These parity bits can be used for:
  i. Hybrid automatic repeat request (HARQ) operator: In the event of a decoding failure, the parity bits received over LSBs can be used to support HARQ soft combining. This scheme may be used to avoid retransmission requests.
  ii. Channel code: In the event of decoding failure of the packet(s) in MSB, an additional decoding attempt may be made using the parity bits received over the LSBs. As an example, fountain codes may be used.

Figure 10:
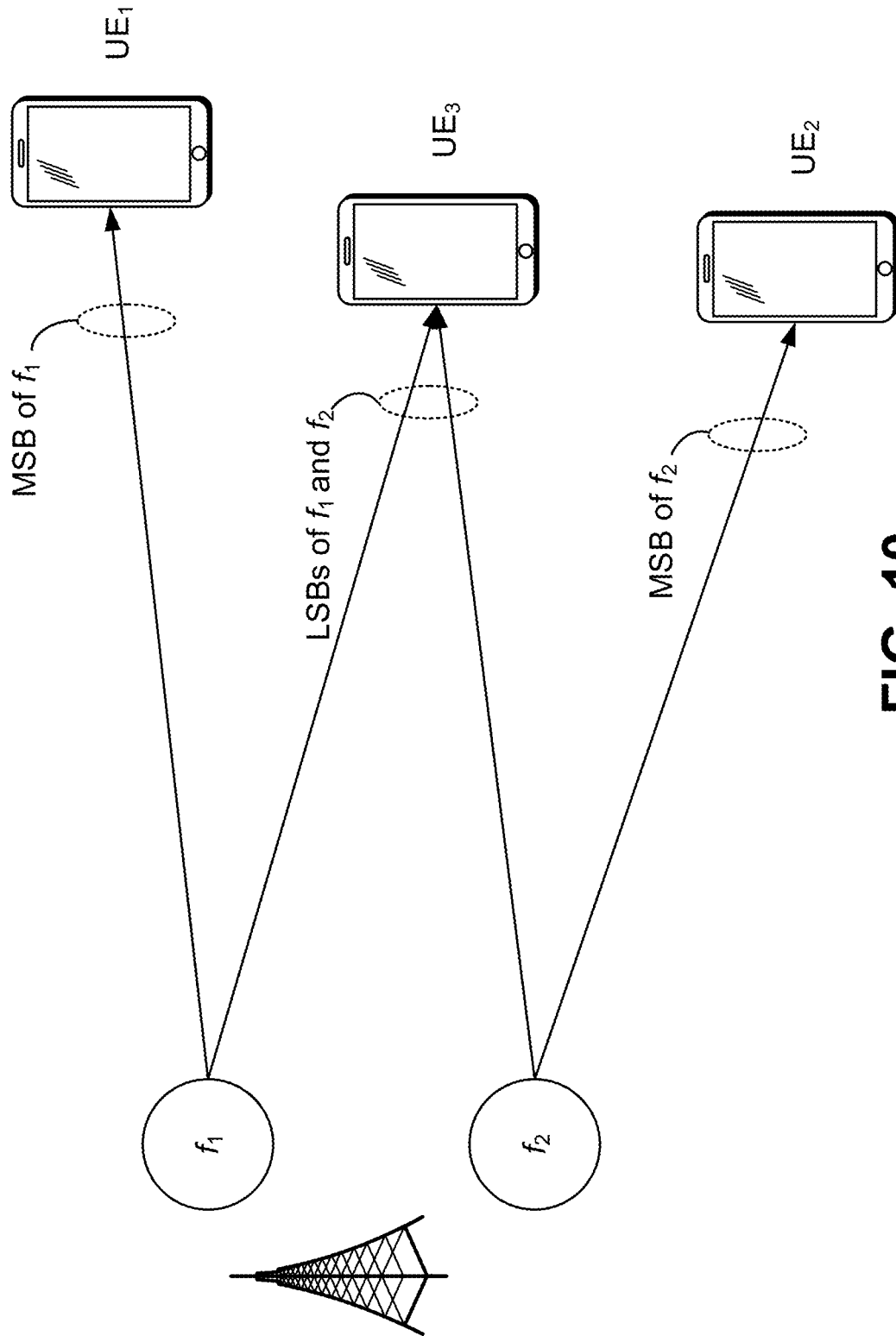
FIG. 10 is a schematic illustration of a multi-user superposition transmission ("MUST"), in accordance with some embodiments.

FIG. 10 is a schematic illustration of a multi-user superposition transmission (MUST) system, in accordance with some embodiments. In particular, FIG. 10 shows an exemplary downlink cellular scenario where a base station (BS) simultaneously communicates three independent information streams to the three users $UE_1$, $UE_2$, and $UE_3$. In an embodiment, the BS maps each user information stream to non-overlapping physical resources.

In at least one embodiment, as shown in FIG. 10, two physical resources (e.g., two frequencies $f_1$, $f_2$) can serve all three users as follows. The $UE_1$ and $UE_2$ information bits are mapped to the MSBs of two composite constellations while $UE_3$ information bits are mapped to the LSBs of both composite constellations. These two composite constellation symbols are transmitted over the two frequencies. The $UE_1$ and $UE_2$ can achieve target performance by controlling the parameter a while the $UE_3$ performance can be improved by the proposed signal combining. This set up may be viewed as serving an extra user without using any additional physical resource.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method of transmitting at least a first data packet and a second data packet, the method comprising:
generating side information as a function of the first data packet and the second data packet, wherein the side information is generated such that the first data packet is recoverable as a function of the side information and the second data packet and wherein the second data packet is recoverable as a function of the side information and the first data packet;
separately encoding the first data packet and the side information for transmission as a first set of symbols in a composite constellation, wherein the composite constellation comprises a side-information constellation for encoding the side information superimposed on a primary constellation for encoding data packet information;
separately encoding the second data packet and the side information for transmission as a second set of symbols in the composite constellation, wherein the first set of symbols and the second set of symbols are combinable to obtain the side information; and
transmitting the first set of symbols and the second set of symbols using different transmission resources.

2. The method of claim 1, wherein generating side information comprises performing a bitwise XOR of the first data packet and the second data packet.

3. The method of claim 1, wherein each point in the composite constellation is represented by $$s_i = \sqrt{1-\alpha}x_1 + \sqrt{\alpha}x_2$$

where $x_1$ is a complex value representing a point in the primary constellation, $x_2$ is a complex value representing a point in the side-information constellation, and $\alpha$ is a power split parameter with $0 \leq \alpha \leq 1$.

4. The method of claim 3, wherein $\alpha \leq 0.10$.

5. The method of claim 3, wherein $\alpha \leq 0.05$.

6. The method of claim 1, wherein the side-information constellation has a greater number of constellation points than the primary constellation, and wherein the side information is encoded at a lower symbol rate than the first and second data packets.

7. The method of claim 1, wherein transmitting the first set of symbols and the second set of symbols using different transmission resources comprises transmitting the first set of symbols and the second set of symbols at different times.

8. The method of claim 1, wherein transmitting the first set of symbols and the second set of symbols using different transmission resources comprises transmitting the first set of symbols and the second set of symbols using different frequencies.

9. The method of claim 1, further comprising, at a user equipment entity:
receiving the first set of symbols and the second set of symbols; and
aligning and combining the first and second sets of symbols to obtain the side information.

10. The method of claim 1, wherein the side-information constellation is rotated by an amount determined by a quadrant of the composite constellation point.

11. The method of claim 1, further comprising, at a user equipment entity:
receiving the first set of symbols and the second set of symbols;
aligning and combining the first set of symbols and the second set of symbols to obtain the side information;
decoding the second set of symbols to obtain the second data packet;
recovering the first data packet from the second data packet and the side information.

12. The method of claim 10, wherein recovering the first data packet is performed in response to an error in decoding the first set of symbols to obtain the first data packet.

13. The method of claim 10, wherein recovering the first data packet comprises performing a bitwise XOR of the second data packet and the side information.

14. A method comprising:
 receiving a first set of symbols and a second set of symbols, each of the first and second sets of symbols comprising symbols in a composite constellation, wherein the composite constellation comprises a side-information constellation for encoding the side information superimposed on a primary constellation for encoding data packet information, wherein the side information is generated such that the first data packet is recoverable as a function of the side information and the second data packet and wherein the second data packet is recoverable as a function of the side information and the first data packet;
 aligning and combining the first set of symbols and the second set of symbols to obtain the side information;
 decoding the second set of symbols to obtain a second data packet; and
 in response to an error in decoding the first set of symbols to obtain a first data packet, recovering the first data packet from the second data packet and the side information.

15. The method of claim 14, wherein recovering the first data packet comprises performing a bitwise XOR of the second data packet and the side information.

16. The method of claim 14, wherein aligning and combining the first set of symbols and the second set of symbols to obtain the side information comprises:
 rotating each of the symbols in the first and second set by an amount determined by a quadrant of the respective symbol;
 combining the rotated first symbol and the corresponding rotated second symbol; and
 decoding the combined rotated symbol.

17. A system for transmitting at least a first data packet and a second data packet, the system comprising:
 logic for generating side information as a function of the first data packet and the second data packet, wherein the side information is generated such that the first data packet is recoverable as a function of the side information and the second data packet and wherein the second data packet is recoverable as a function of the side information and the first data packet;
 an encoder operative to encode the first data packet and the side information as a first set of symbols in a composite constellation, wherein the composite constellation comprises a side-information constellation for encoding the side information superimposed on a primary constellation for encoding data packet information;
 the encoder further being operative to encode the second data packet and the side information as a second set of symbols in the composite constellation, wherein the first set of symbols and the second set of symbols are combinable to obtain the side information; and
 a transmitter operative to transmit the first set of symbols and the second set of symbols using different transmission resources.

18. The system of claim 17 wherein the logic for generating side information comprises XOR logic.

19. The system of claim 17, wherein each point in the composite constellation is represented by $$s_i = \sqrt{1-\alpha}\, x_1 + \sqrt{\alpha}\, x_2$$

where $x_1$ is a complex value representing a point in the primary constellation, $x_2$ is a complex value representing a point in the side-information constellation, and $\alpha$ is a power split parameter with $0 \leq \alpha \leq 1$.

* * * * *